United States Patent Office 3,172,503
Patented Mar. 9, 1965

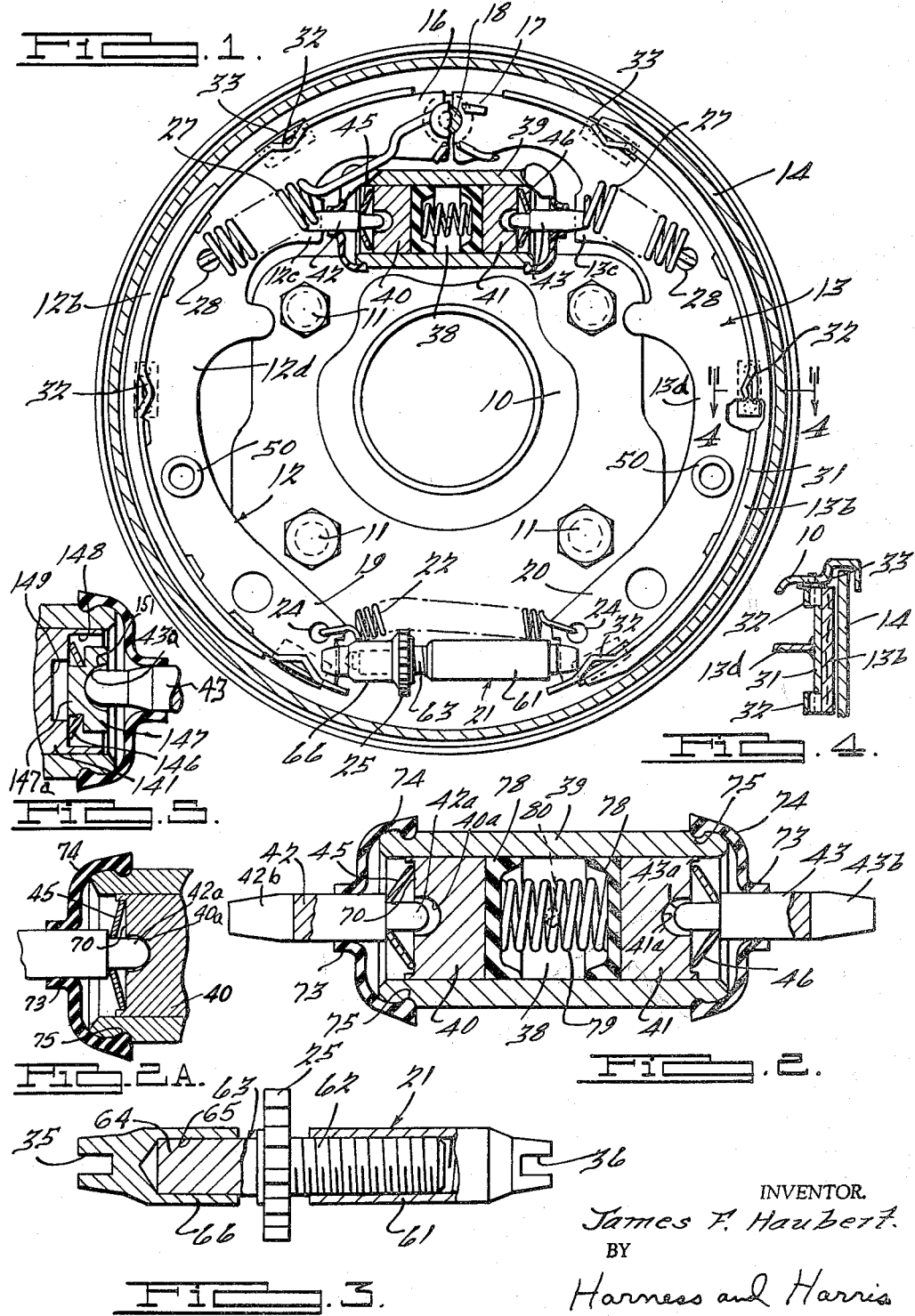

3,172,503
BRAKE SHOE THRUST LINK VIBRATION DAMPER
James F. Haubert, Royal Oak, Mich., assignor to Chrysler Corporation, Highland Park, Mich., a corporation of Delaware
Filed Apr. 2, 1962, Ser. No. 184,097
5 Claims. (Cl. 188—78)

This invention relates to a resilient linkage means for eliminating those noises denominated brake chatter, brake squeak or brake squawk which frequently occur when the shoes of a vehicle wheel brake are applied to the associated brake drum. Certain of these noise and impulse producing vibrations that are generated during braking appear to be transmitted through the shoe applying linkage to the brake backing or support plate and thence to the vehicle body such that they are detectable by the passengers of the vehicle and are thereby objectionable.

This invention provides a vibration damping means such that vibrations set up by the brake shoes during brake application will not be transmitted from the shoes to the associated brake support plate or any other associated member.

It is an object of this invention to incorporate a resilient means in the linkage connecting the brake shoe actuators with the associated brake shoes such that there will be a damping of the objectionable vibrations during brake application. This damping means in the shoe actuation system tends to eliminate transmission of shoe generated vibrations to the brake support plate during braking operation.

It is still another object of this invention to provide a compressible, resilient, dished or cone, washer element between the brake shoe and the associated actuator piston of a hydraulically actuated brake mechanism such that the coned washer will initially flex and damp out any chatter or grab impulse vibrations after which the linkage associated with the coned washer will become rigid for direct application of the piston applied force that produces shoe application to the associated brake drum.

It is still another object of this invention to provide a simplified, economical vibration damping means for wheel brake mechanisms that is particularly effective in damping vibrations in the 20–30 c.p.s. range and yet provides a rigid brake actuation linkage for all moderate and heavy braking applications.

Other objects and advantages of this invention will be readily apparent from a reading of the following description and a consideration of the related drawings wherein:

FIG. 1 is a side elevational view, partly in section, of a servo-type brake embodying this invention;

FIG. 2 is an enlarged sectional elevational view of the hydraulically operated wheel cylinder of the brake mechanism shown in FIG. 1, which wheel cylinder includes the resilient means that accomplishes damping of sound producing braking vibrations;

FIG. 2A is a fragmentary sectional elevational view of one end portion of the wheel cylinder shown in FIG. 2 when the brake shoes are being applied;

FIG. 3 is an enlarged sectional elevational view of the interconnecting adjustable link or strut between the heel ends of the two brake shoes of the brake mechanism shown in FIG. 1.

FIG. 4 is an enlarged, fragmentary, sectional elevational view taken along the line 4—4 of FIG. 1 showing the backing plate support of the brake shoes; and FIG. 5 is a fragmentary sectional elevational view of a modified form of this invention.

The brake mechanism shown in FIG. 1 comprises a backing plate 10 that has bolt connectors 11 adapted to be connected to an axle carrier or wheel spindle member that would carry the wheel braking mechanism. Movably mounted on the backing plate 10 are a pair of arcuate brake shoes 12 and 13 which brake shoes are adapted to be expanded radially outwardly to engage the surrounding brake drum indicated by the reference numeral 14. The heel end portions 19 and 20 of the brake shoes 12 and 13, respectively, are interconnected by an adjustable length thrust link or strut that is generally identified by the reference numeral 21. A tension spring 22 is interconnected between holes 24 in the heel ends of the brake shoes 12 and 13. This tension spring 22 maintains the heel ends of the brake shoes 12 and 13 in engagement with the slotted ends 35, 26 (see FIG. 3) of the adjustable strut linkage 21. Furthermore, the spring 22 is positioned with respect to the adjustable link 21 such that it bears against the toothed periphery 25 of the star wheel on the bolt element 63 of the adjustable linkage 21. The bearing of the spring 22 against the toothed periphery 25 of the bolt 63 prevents unintended or accidental rotation of the adjusting bolt 63. A more detailed description of linkage 21 is given hereafter.

A tension spring 27 is connected between the toe end of each of the brake shoes 12 and 13 and the anchor pin 18. Springs 27 cause the brake shoes to be retracted from braking engagement with the surrounding brake drum 14 when brake application is released. The application of the brake shoes 12, 13 to the brake drum 14 is effected through the introduction of pressurized fluid into the wheel cylinder 39. Cylinder 39 is mounted on the backing plate 10 adjacent the toe ends of the brake shoes and its pistons 40, 41 are connected to the brake shoes 12, 13 respectively by thrust links 42 and 43 as will be hereafter described.

As shown in the fragmentary sectional view of FIG. 4, the side edges of the brake shoe rims 31 are provided with notched portions 32 that bear against seat portions 33 press-formed on the backing plate 10. These shoe seat portions 33 assist in guiding the movement of the brake shoes 12 and 13 as they are moved into and out of engagement with the associated brake drum 14. The surface of the raised step or seat portion 33 of the brake drum backing plate 10 may be coated with some sort of sound deadening material, such as nylon or Teflon, if it is desired to insulate the edges of the brake shoe rims 31 from the backing plate 10. This feature is not a part of this invention but is disclosed in a copending application of Stephan Weltyk, Serial No. 184,300, filed April 2, 1962.

The toe ends 16 and 17 of the brake shoes 12 and 13 respectively are formed with substantially semi-circular openings at their end portions so as to matingly fit about the cylindrical anchor pin 18. It is thought to be obvious that when pressurized fluid is applied to the interior portion 38 of the wheel cylinder 39 that the wheel cylinder pistons 40 and 41 will be expanded outwardly so as to apply a radially expanding force to the toe ends of the brake shoes 12 and 13 through the thrust link 42 and 43 respectively. From a consideration of FIG. 2, in particular, it is thought to be obvious that during initial pressurization build-up in the wheel cylinder bore portion 38 that the pistons 40 and 41 will be moved outwardly and transmit their force to the thrust links 42 and 43 through the substantially unstressed, flexible, coned washers 45 and 46 respectively. As the brake shoes 12, 13 are brought into engagement with the surrounding brake drum 14 then there is a progressive compression of the coned or dished washers 45 and 46 as the braking pressures increase until the inner ends 42a, 43a seat on the respective piston seats 40a and 41a (see FIG. 2A). At the same time that the brake shoes 12, 13 are being applied to the brake drum 14, the rotating drum causes a servo braking action to develop. This servo action results from the brake shoes being picked up by the rotating brake drum and moved circumferentially in the direction of drum rotation so as to anchor the toe end of one of the brake shoes against the anchor post 18 to provide the reaction point for the shoe braking action. From the foregoing description it is thought to be clear that during this initial application of the brake shoes that the inner ends 42a and 43a of the studs 42 and 43 respectively are not in direct engagement with the seat portions 40a and 41a of the pistons 40 and 41 respectively and as a result the wheel cylinder generated force that is being applied to the brake shoes is through the compressible resilient coned washers 45 and 46.

From the preceding description of the wheel cylinder actuated thrust links 42, 43 and their associated resilient washer members 45, 46, it is thought to be clear that during initial brake application, when the brake shoes are first brought into braking contact with the associated brake drum 14, there will be a compressional flattening of the coned or dished washers 45, 46 during which time the resilient washers 45, 46 act to damp any impulse or sound producing vibrations that may develop due to uneven, intermittent, or non-conforming contact of the brake shoe friction surfaces 12b and 13b with the associated brake drum 14. It is believed that this compression of the resilient washers 45, 46 absorbs or damps these vibrations generated during braking contact between the brake shoes 12, 13 and the brake durm 14 when the braking pressures are relatively low. As the braking pressures increase and the brake shoe linings 12b, 13b are forced into conforming engagement with the brake drum friction surface, the resilience of the washers 45, 46 is no longer required because the impulse and sound producing vibrations are no longer generated and thus the stud ends 42a and 43a of the thrust links 42, 43 then seat on the portions 40a and 41a of the wheel cylinder pistons (see FIG. 2A). At this time there is a direct, rigid, force-transmitting connection between the pistons 40, 41 and the brake shoes 12, 13.

While in the case shown thrust links 42, 43, with slotted ends 42b and 43b respectively, to seat the shoe web portions 12d, 13d, have been used to interconnect the pistons 40, 41 with the shoes 12, 13, still, it would be possible to seat a finger portion 12c, 13c of the brake shoe webs directly against the coned washers 45, 46 and thus eliminate the use of the separate thrust links 42, 43. In such a case the finger portion of the brake shoe would eventually come to rest against the piston seat portions 40a, 41a of the wheel cylinder pistons in the same manner as the stud portions 42a and 43a when the braking pressures reach relatively high intensities.

FIG. 3 shows the shoe positioning adjusting linkage 21 that interconnects the heel ends 19, 20 of the brake shoes 12 and 13. This adjusting linkage consists of a sleeve-type member 61 that has a slotted outer end 36 that is adapted to matingly receive the heel end of the web 20 of the brake shoe 12 to prevent relative rotation therebetween. The sleeve 61 is internally threaded so as to receive the threaded stud portion 62 of the adjusting bolt 63. The other end 64 of bolt 63 is rotatably journaled in the bore 65 of the sleeve member 66. Sleeve 66 has a slot 35 to receive the heel end of shoe web 12d to prevent relative rotation therebetween. A star-wheel portion 25 is formed on the bolt 63 intermediate the bolt portions 62 and 64. The toothed periphery of the star-wheel portion 25 facilitates rotation of bolt 63 to adjust the brake shoes. As the adjusting bolt mechanism 21 does not form a part of this invention and as it is a conventional type used in servo-type brakes, it is not thought that any additional description of this mechanism need be given.

With the resilient washer mechanism shown in FIG. 2, it will be noted that the coned washers 45, 46 are countersunk into depressed seat formations 70 formed on the outer ends of the pistons 40, 41 so that the outside peripheral edges of the washers will not bear against or dig into the bore of the wheel cylinder 39. Furthermore, from a standpoint of rigidity, the resiliency of the coned washers 45 and 46 is such that by the time relatively high braking force is needed the stud ends 42a, 43a of the studs 42, 43 are seated against the seat portions 40a, 41a of the wheel cylinder pistons so that a rigid linkage is established for transmitting the braking force from the wheel cylinder pistons to the brake shoes.

As can be seen from FIG. 2 the outer ends of the wheel cylinder 39 are covered by boots 74 having necks 73 that sealingly engage about the thrust links 42, 43. Boots 74 have their other end portions shaped to seat in grooves 75 formed around the periphery of the wheel cylinder ends. The wheel cylinder 39 is of substantially standard construction and is not thought to require detailed description. There is provided on the inwardly disposed sides of the pistons 40, 41 the usual sealing cup members 78 that are urged into engagement with the inner sides of the pistons 40, 41 by means of the compression spring 79. An opening 80 in cylinder 39 represents the port that feeds pressure fluid from the master cylinder (not shown) to the wheel cylinder 39.

The brake shoes 12 and 13 that are seated on the several backing plate seat formations 33, are resiliently held in position on the seats 33 by means of the brake shoe hold-down springs 50 which may be of any conventional type. The springs 50 permit radial movement and/or some circumferential movement of the brake shoes with respect to the backing plate 10.

One of the particular advantages of this type of brake impulse noise eliminator over noise eliminators of the type wherein a resilient damping means is associated with the adjustable link interconnecting the heel ends of the brake shoes, is that by this piston carried means the entire length of both shoes is effectively isolated from the wheel cylinder and backing plate by a resilient damping means located at the very connection of shoe toe ends to the wheel cylinder pistons. Not only are noise vibrations prevented from being transmitted to the backing plate 10 and any other brake supporting structures, but furthermore, the damping can be controlled by and coordinated with the braking pressures being applied so that the resilience of the damping means can be eliminated at a preselected time or value. This invention provides an easy manner of varying the damping with different brake sizes and designs by merely varying the resilience of the coned washers 45, 46 or other resilient means used in accordance with this invention. Different strength springs can be used for the primary and secondary shoe pistons in servo brake units.

FIG. 5 shows a modified form of this invention wherein the wheel cylinder piston 141 is provided with a stepped bore 148, 149 on its outer end that is adapted to matingly receive and seat a thrust plug 147. Interposed between the piston bore 148 and the thrust plug 147 is a resilient dished or cone washer element 146 that normally holds the plug 147 out of contact with the piston bore 148, 149. The outer end of the thrust plug 147 is formed with a hemispherical bearing seat 151 that journals the rounded end 43a on the thrust link 43. The operation of the washer element shown in FIG. 5 is identical to that described with respect to the washer of FIGS. 1–4 form of this invention. However, with the FIG. 5 design it is possible to use conventional thrust links 43 because the thrust plug 147 is formed out of the materials of the piston 141 with the resilient washer means 146 sandwiched between the piston and thrust plug. After a predetermined braking pressure has been applied by the piston 141 the thrust plug 147 seats on the bottom of the bore 149 and thereafter a rigid linkage interconnects the wheel cylinder piston 141 and the associated brake shoe (not shown). It will also be noted that the coned flexible washer 146 has portions 147a of the thrust plug 147 mounted in the washer opening so that the washer 146 tends to keep the thrust plug centered in the piston bore 148, 149. The FIG. 5 form of the invention functions to damp noise producing vibrations transmitted from the associated brake shoe through the thrust link 43 and plug 147 to the spring element 146 by compressive deflection of the washer 146. Flexing of the washer during relatively light braking pressure applications seems to eliminate the variety of brake noises that can develop in brakes of the disclosed type. When heavy braking pressures are applied noises do not seem to be existent and under such circumstances the shoe to wheel cylinder linkage functions as a rigid linkage with the coned washer 146 being flattened and bypassed.

I claim:

1. In a brake mechanism, a support plate, a shoe anchor formation on said support plate, a brake shoe movably mounted on said support plate for actuation into engagement with a brake drum, one end of said shoe being arranged to react against said shoe anchor and the other end of said shoe adapted to be connected to a shoe actuating means, a hydraulic wheel cylinder shoe actuation means mounted on said support plate adjacent said other end of said shoe comprising a pressure fluid actuated reciprocable piston having a spring seat on its exposed outer end, a coned spring washer mounted on said piston spring seat so as to converge outwardly and provide the only path for vibration transmission from said shoe other end to said piston, and a rigid thrust link extending between the outer end of said coned spring washer and said other end of said brake shoe to transmit thrust therebetween with said thrust link normally spaced from contact with said piston but arranged to seat thereon after a predetermined compression of said spring washer.

2. In a brake mechanism, a support plate, a shoe anchor formation on said support plate, a brake shoe movably mounted on said support plate for actuation into engagement with a brake drum, one end of said shoe being arranged to react against said shoe anchor and the other end of said shoe adapted to be connected to a shoe actuating means, a hydraulic wheel cylinder shoe actuation means mounted on said support plate adjacent said other end of said shoe comprising a pressure fluid actuated reciprocable piston having a spring seat on its exposed outer end, a coned spring washer mounted on said piston spring seat so as to converge outwardly, and a rigid thrust link extending between the outer end of said coned spring washer and said other end of said brake shoe to transmit thrust therebetween, said thrust link having a portion extending inwardly through the opening in said coned washer and normally spaced from said piston but arranged to seat on said piston after a predetermined compression of said coned spring washer.

3. In a brake mechanism, a support plate, a shoe anchor formation on said support plate, a brake shoe movably mounted on said support plate for actuation into engagement with a brake drum, one end of said shoe being arranged to react against said shoe anchor and the other end of said shoe adapted to be connected to a shoe actuating means, a hydraulic wheel cylinder shoe actuation means mounted on said support plate adjacent said other end of said shoe comprising a pressure fluid actuated reciprocable piston having a spring seat on its exposed outer end, a coned spring washer mounted on said piston spring seat so as to converge outwardly, and a rigid thrust link extending between the outer end of said coned spring washer and said other end of said brake shoe to transmit thrust therebetween, said thrust link having a portion extending inwardly through the opening in said coned washer and normally spaced from said piston but arranged to seat on said piston after a predetermined compression of said coned spring washer, said inwardly projecting portion of said rigid thrust link extending into a bore formed in the outer end of said piston that has the bottom normally spaced from the inner end of the thrust link.

4. In a brake mechanism, a support plate, a shoe anchor formation on said support plate, a brake shoe movably mounted on said support plate for actuation into engagement with a brake drum, one end of said shoe being arranged to react against said shoe anchor and the other end of said shoe adapted to be connected to a shoe actuating means, a hydraulic wheel cylinder shoe actuation means mounted on said support plate adjacent said other end of said shoe comprising a pressure fluid actuated reciprocable piston having a stepped bore in its exposed outer end, a coned spring washer mounted in said piston stepped bore so as to converge outwardly, a rigid thrust plug mounted on the outer end of said coned spring washer having a thrust link seat on its outer end, said thrust plug being normally spaced from said piston but adapted to seat thereon after a predetermined compression of said coned spring washer and a rigid thrust link extending between the outer end of said thrust plug and said other end of said brake shoe to transmit thrust therebetween.

5. In a brake mechanism, a support plate, a shoe anchor formation on said support plate, a brake shoe movably mounted on said support plate for actuation into engagement with a brake drum, one end of said shoe being arranged to react against said shoe anchor and the other end of said shoe adapted to be connected to a shoe actuating means, a hydraulic wheel cylinder shoe actuation means mounted on said support plate adjacent said other end of said shoe comprising a pressure fluid actuated reciprocable piston having a stepped bore in its exposed outer end, a coned spring washer mounted in said piston stepped bore so as to converge outwardly, a rigid thrust plug mounted on the outer end of said coned spring washer having a thrust link seat on its outer end, and a rigid thrust link extending between the outer end of said thrust plug and said other end of said brake shoe to transmit thrust therebetween, said thrust plug having a portion extending inwardly through the opening in said coned washer and normally spaced from said piston but arranged to seat on said piston after a predetermined compression of said coned spring washer.

References Cited in the file of this patent

UNITED STATES PATENTS

| | | |
|---|---|---|
| 1,648,864 | Pugh | Nov. 8, 1927 |
| 1,707,742 | Schjolin | Apr. 2, 1929 |
| 1,800,280 | Fishback | Apr. 14, 1931 |
| 2,224,215 | Chartock et al. | Dec. 10, 1940 |
| 2,796,954 | Kaiser | June 25, 1957 |
| 2,966,238 | Lauer et al. | Dec. 27, 1960 |
| 3,035,666 | Beeskow | May 22, 1962 |